United States Patent
Kumiya

Patent Number: 5,988,850
Date of Patent: Nov. 23, 1999

[54] CURVE INTERPOLATION METHOD FOR PERFORMING VELOCITY CONTROL DURING CONNECTING MOTION OF A ROBOT

[75] Inventor: Hidetoshi Kumiya, Oshino-mura, Japan

[73] Assignee: Fanuc, Ltd., Yamanashi, Japan

[21] Appl. No.: 08/836,055

[22] PCT Filed: Sep. 2, 1996

[86] PCT No.: PCT/JP96/02472

§ 371 Date: Apr. 29, 1997

§ 102(e) Date: Apr. 29, 1997

[87] PCT Pub. No.: WO97/08596

PCT Pub. Date: Mar. 6, 1997

[30] Foreign Application Priority Data

Aug. 31, 1995  [JP]  Japan ................................ 7-245109

[51] Int. Cl.⁶ .................................................. G05B 19/18
[52] U.S. Cl. ............................... 364/167.09; 364/167.07; 318/568.18; 395/87
[58] Field of Search ................... 364/474.31, 167.09, 364/474.3, 474.29, 167.07; 395/80, 87; 318/568.1, 568.15, 568.18, 573

[56] References Cited

U.S. PATENT DOCUMENTS

| | | | |
|---|---|---|---|
| 4,836,742 | 6/1989 | Ishiguro et al. | 414/742 |
| 5,140,236 | 8/1992 | Kawamura et al. | 318/568.1 |
| 5,222,198 | 6/1993 | Yamamoto et al. | 395/80 |

FOREIGN PATENT DOCUMENTS

| | | |
|---|---|---|
| 59-180604 | 10/1984 | Japan . |
| 64-1008 | 1/1989 | Japan . |
| 7-64622 | 3/1995 | Japan . |

*Primary Examiner*—Paul P. Gordon
*Attorney, Agent, or Firm*—Staas & Halsey, LLP

[57] ABSTRACT

An interpolation method for enabling a robot to make a smooth connecting motion accompanied by velocity control even in the case where the connecting motion involves a nonzero-acceleration motion. During motion path planning for the robot, in order to perform an interpolation so that a point $a^{(o)}$ on a first motion path G and a point $b^{(o)}$ on a second motion path H may be smoothly connected by a connecting curve S, the connecting curve S being determined using a parameter including time instant t. First, a function p(T, t) satisfying boundary conditions (continuity of position, velocity, acceleration, etc.) corresponding to required smoothness $C^k$ is derived as a polynomial equation or the like including an unknown parameter T, and by optimizing a suitable evaluation function $\epsilon(T)$, $T_0$ for keeping the velocity constant is obtained. Interpolation is performed using $q(t)=p(T_0, t)$, whereupon a connecting motion, in which the velocity is controlled to a constant value, can be attained. Where a composite function $(q \circ f)(t)$ including an adjustment function f(t) corresponding to a desired velocity transition pattern is used for the interpolation, the velocity can be varied in a desired manner during the connecting motion.

16 Claims, 7 Drawing Sheets

CURVE INTERPOLATION METHOD FOR PERFORMING VELOCITY CONTROL DURING CONNECTING MOTION OF A ROBOT

FIELD OF THE INVENTION

The present invention relates to a curve interpolation method for performing velocity control of an industrial robot, and more particularly, to a method of performing curve interpolation for smoothly connecting two motion paths in parallel with velocity control along the connected paths according to a given path plan.

BACKGROUND OF THE RELATED ART

In applications of robots such as a sealing robot or an arc welding robot, for example, when bringing the robot to continuously make rectilinear motion or arcuate motion, it is often necessary that motion paths be connected with a smooth connecting curve and that velocity control be performed for the robot motion along the connected curve. There have already been made several proposals for the curve to connect the paths of uniform rectilinear motions accompanying the velocity control of the motion on such a connecting curve. However, there has not been any interpolation method by which a smooth velocity control can be realized in those cases where one or both of motions to be connected are arcuate motions, in which the acceleration cannot be zero (nonzero-acceleration motion), so that the velocity control of such motions has been given up. This has been a major hindrance to the construction of the system for control or teaching of the robot.

SUMMARY OF THE INVENTION

An object of the present invention is to provide an interpolation method, which enables, even a connecting motion of a robot involving not only rectilinear motions but also motions of nonzero acceleration, such as arcuate motions, to generate a connecting curve joining two motions while at the same time carrying out velocity control with high accuracy. With this merit, the present invention can lighten the load of the system construction and teaching of robots in various applications, such as a sealing robot, an arc welding robot, etc.

The present invention provides a curve interpolation method that enables velocity control during a connecting motion of a robot for connecting first and second motions accompanying movement along a route, in establishing motion path plan in accordance with an operation program to operate by software processing in a robot control device.

The most basic velocity control applied during a connecting motion is "constant-velocity control", which can be achieved by employing an interpolation method as described below.

In such a case, an interpolation method according to the present invention comprises the steps of: (a1) giving an equation representing a connecting curve for smoothly connecting a first connection point specified on a path of the first motion and a second connection point specified on a path of the second motion with a parameter q(t) based on time t and (b1) periodically setting an interpolation point in three-dimensional space by using the parameter q(t).

In the above step (a1), a function p(T, t) satisfying a boundary condition corresponding to a class-$C^k$ (where k is a positive integer) of smoothness required for the connecting motion is derived as an equation including an unknown parameter T corresponding to a time period for connection, and a calculation process is performed to obtain a value of T, $T=T_0$, with which velocity is kept at least approximately constant through the connecting motion by optimizing an evaluation function $\epsilon(T)$ for evaluating a deviation of a partial differential of time in the function p(T, t) from a reference value.

The reference value for the partial derivative of time in the function p(T, t) corresponds to the velocity of the first motion at the first connection point.

In the step (b1), interpolation in three-dimensional space is performed by using $q(t)=p(T_0, t)$ as the parameter representation q(t), whereby the velocity is controlled to a constant value through the connecting motion.

The function p(T, t) derived in the step (a1) may be a polynomial equation for t including the unknown parameter T corresponding to the connection time period. A typical class of smoothness required for connecting motions is class-$C^2$. The class-$C^2$ smoothness ensures the continuity of position, velocity and acceleration within a connection interval including the two connection points. The interpolation method for such constant-velocity control is applicable also to a nonzero-acceleration motion in which one or both of the first and second motions are arcuate motions.

The interpolation method for "constant-velocity control" may be modified, as described later, so that the velocity during a connecting motion can be varied.

In such a case, an interpolation method according to the present invention comprises the steps of: (a2) establishing, by means of parameter representation s(t) based on time instant t, an equation representing a smooth curve connecting a first connection point specified on a path of the first motion and a second connection point specified on a path of the second motion and (b2) eriodically setting an interpolation point in three-dimensional space by using the parameter s(t).

In the step (a2), a function p(T, t) satisfying a boundary condition corresponding to a class-$C^k$ (where k is a positive integer, and this is true of all other occurrences of k) of smoothness required for the connecting motion is derived as an equation including an unknown parameter T corresponding to a connection time period, and a calculation process is performed to obtain a value of T, $T=T_0$, with which velocity is kept at least approximately constant through the connecting motion by optimizing an evaluation function $\epsilon(T)$ for evaluating a deviation of a partial differential of time in the function p(T, t) from a reference value. The reference value for the partial differential of time in the function p(T, t) corresponds to the velocity of the first motion at the first connection point.

In the step (b2), $s(t)=(q \circ f)(t)$, a composite function of $q(t)=p(T_0, t)$ and an adjustment function f(t), is used as the parameter representation s(t). The adjustment function f(t) has the class-$C^k$ smoothness and is determined in advance so that the velocity undergoes a desired transition through the connecting motion.

As in the case of "constant-velocity control", the function p(T, t) derived in the step (a2) may be a polynomial equation for t including the unknown parameter T corresponding to the connection time period. A typical class of smoothness required for connecting motions is class-$C^2$. The class-$C^2$ smoothness ensures the continuity of position, velocity and acceleration within a connection interval including the two connection points. Thus, desired velocity control can be achieved during the connecting motion even in the case of a nonzero-acceleration motion in which one or both of the first and second motions are arcuate motions.

During movement of the robot along a route, a motion path plan is formed in accordance with the operation program to operate by software processing in the robot control device. In the motion path planning, interpolation in three-dimensional space is planned first. According to the present invention, a technical means for deriving an interpolation formula applicable in the stage of interpolation is provided for the velocity control during a motion for connecting two motions such as rectilinear motion and arcuate motion.

To derive an interpolation formula applicable during a connecting motion, it is necessary only to give a formula representing a curve smoothly connecting two connection points with a parameter based on time instant t. In the case where "constant-velocity control", is desired, a function $p(T, t)$ satisfying a boundary condition corresponding to a class-$C^k$ (where k is a positive integer) of smoothness required for the connecting motion is derived as a polynomial equation or the like including an unknown parameter T corresponding to the connection time period, and a calculation process is executed to obtain a value of T, $T=T_0$, with which the velocity is kept at least approximately constant through the connecting motion by optimizing an evaluation function $\epsilon(T)$ for evaluating a deviation of the partial differential of time in the function $p(T, t)$ from a reference value.

The reference value for the partial differential of time in the function $p(T, t)$ corresponds to the initial velocity of the connecting motion. Interpolation in three-dimensional space is then performed by using $q(t)=p(T_0, t)$ as the parameter representation, whereby the velocity is controlled to a constant value through the connecting motion.

Also in the case where the intended control is one such that the velocity is allowed to undergo a desired transition, a function $p(T, t)$ satisfying a boundary condition corresponding to a class-$C^k$ (where k is a positive integer) of smoothness required for the connecting motion is derived as a polynomial equation or the like including the unknown parameter T corresponding to the connection time period, and a calculation process is executed to obtain a value of T, $T=T_0$, with which the velocity is kept at least approximately constant through the connecting motion by optimizing the evaluation function $\epsilon(T)$ for evaluating a deviation of the partial derivative of time in the function $p(T, t)$ from a reference value.

The reference value for the partial derivative of time in the function $p(T, t)$ corresponds to the initial velocity of the connecting motion.

Instead of using $q(t)=p(T_0, t)$ directly as the parameter representation, $s(t)=(q \circ f)(t)$, a composite function of $q(t)=p(T_0, t)$ and an adjustment function $f(t)$, is used as parameter representation $s(t)$. For the adjustment function $f(t)$, a function having a class-$C^k$ smoothness and causing a uniform increase, in narrow sense, is selected.

When t is changed within a range of $0 \leq t \leq f^{-1}(T_0)$, the composite function $s(t)=(q \circ f)(t)$ overlaps the path of $q(t)=p(T_0, t)$ [$0 \leq t \leq T_0$]. The velocity along the path, on the other hand, can be varied freely by selecting the function $f(t)$.

More particularly, the function $f(t)$ can be considered to have the function for adjusting (expanding and compressing) the lapse of time. For this reason, $f(t)$ is called "adjustment function" in the present specification.

DESCRIPTION OF THE PREFERRED EMBODIMENTS

Figure 1:
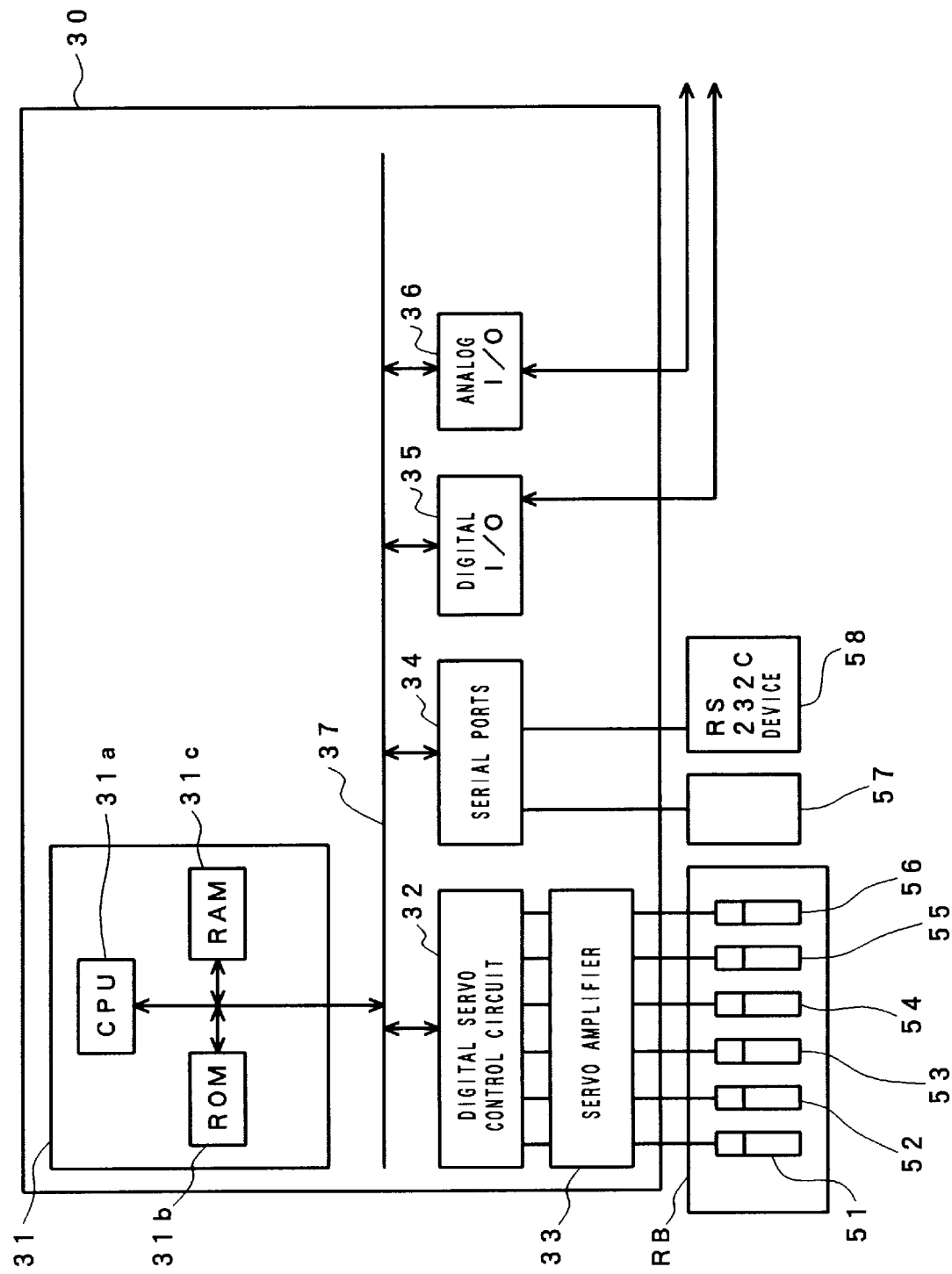
FIG. 1 is a block diagram showing a typical configuration of a principal part of a robot control device to which an embodiment of the present invention is applied.

To carry out an interpolation method according to the present invention during motion path planning, a robot control device having an ordinary hardware configuration can be used. FIG. 1 is a block diagram showing an example of a typical configuration of a principal part of such a control device.

As shown in FIG. 1, a robot control device 30 is provided with a processor board 31, on which a microprocessor to serve as a central processing unit (CPU) 31a, a ROM 31b, and a RAM 31c are mounted.

The CPU 31a globally controls the whole robot control device in accordance with a system program stored in the ROM 31b. A considerable part of the RAM 31c forms a nonvolatile memory area for storing taught data, position data, various set values, operation programs, etc. Also, part of the RAM 31c is used for the temporary storage of data for the calculation etc. to be executed by the CPU 31a.

The processor board 31 is connected to a bus 37, so that commands and data can be exchanged with other parts of the robot control device by means of the bus connection. To be more specific, a digital servo control circuit 32 is connected to the processor board 31, whereby servomotors 51 to 56 are driven via a servo amplifier 33 in response to the commands from the CPU 31a. The servomotors 51 to 56, which actuate respective axes, are built in a robot RB.

Also connected to the bus 37 are serial ports 34, which in turn are connected to a teaching control panel 57 equipped with a liquid crystal display, and an RS-232C device (communications interface) 58. The teaching control panel 57 is used for the entry of programs such as operation programs, position data, and other necessary set values, etc. In addition, a digital signal input/output device (digital I/O) 35 and an analog signal input/output device (analog I/O) 36 are connected to the bus 37.

Figure 2:
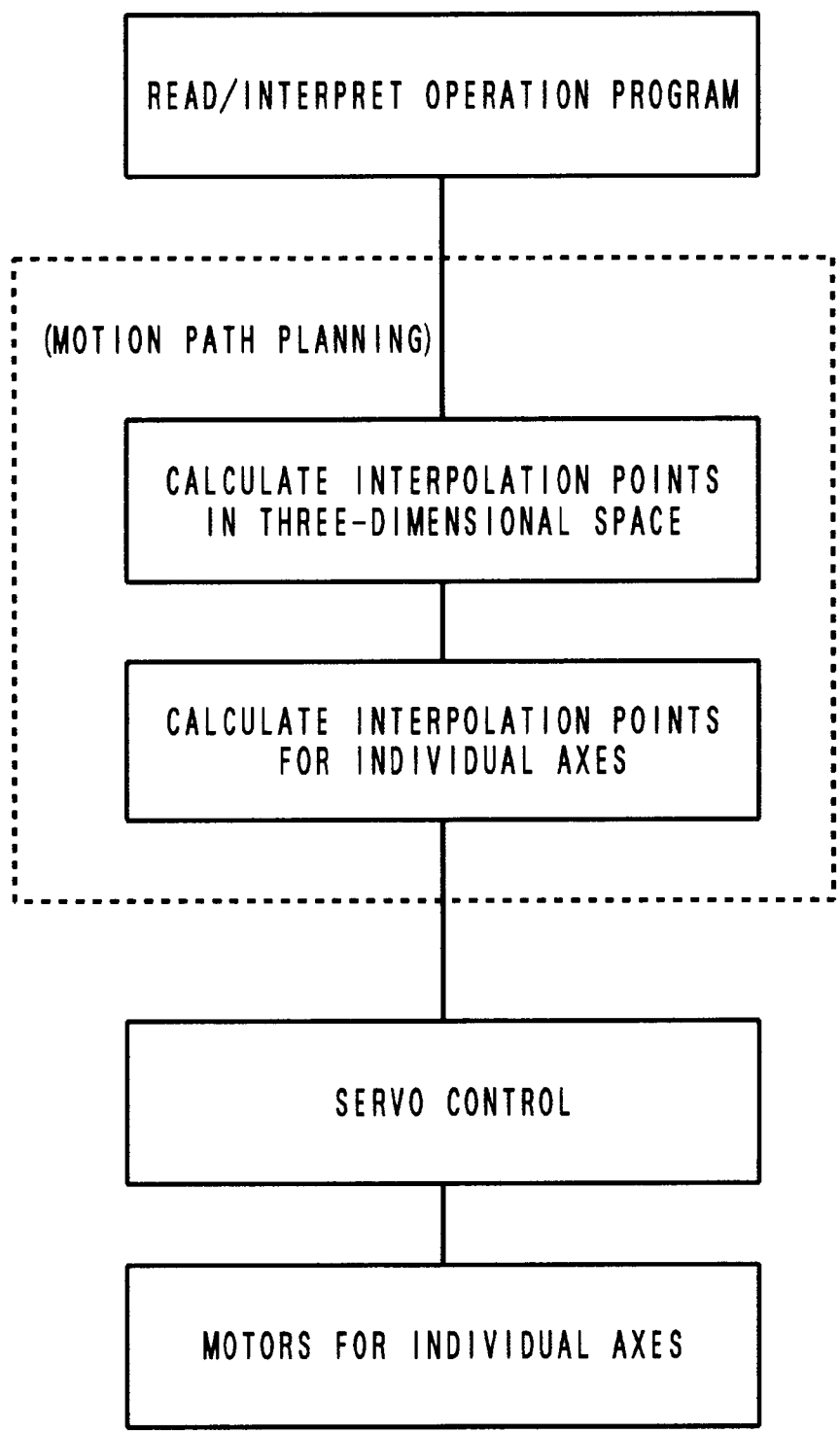
FIG 2. is a block diagram schematically showing a processing system used for robot control.

FIG. 2 is a block diagram schematically showing a processing system used for robot control. First, an operation program is read and interpreted (decoded), whereby a taught route, command velocities and the like are specified.

In the subsequent motion path planning, a motion path plan is formed with respect to the specified items (taught route, command velocities, etc.). During this motion path planning, interpolation points in three-dimensional space are calculated, and then interpolation points for the individual axes are specified by means of inverse kinematics. The interpolation points thus specified are transferred to servo control systems of the respective axes at predetermined intervals of time, whereby the servomotors of the respective axes are subjected to servo control.

In terms of a hardware operation, it is a common practice that a series of processes from the interpretation of the program to the specification of interpolation points for the individual axes is executed by the main CPU 31$a$ of the robot control device 30, and a servo CPU in the digital servo control circuit 32 receives the information of interpolation points via the shared RAM and executes servo control of the servomotors 51 to 56 of the respective axes.

The object of the present invention is accomplished by a novel calculation procedure for the calculation of interpolation points in three-dimensional space for a given block of the "motion path planning". This calculation procedure will be explained below with reference to an example of the case shown in FIG. 3.

Figure 3:
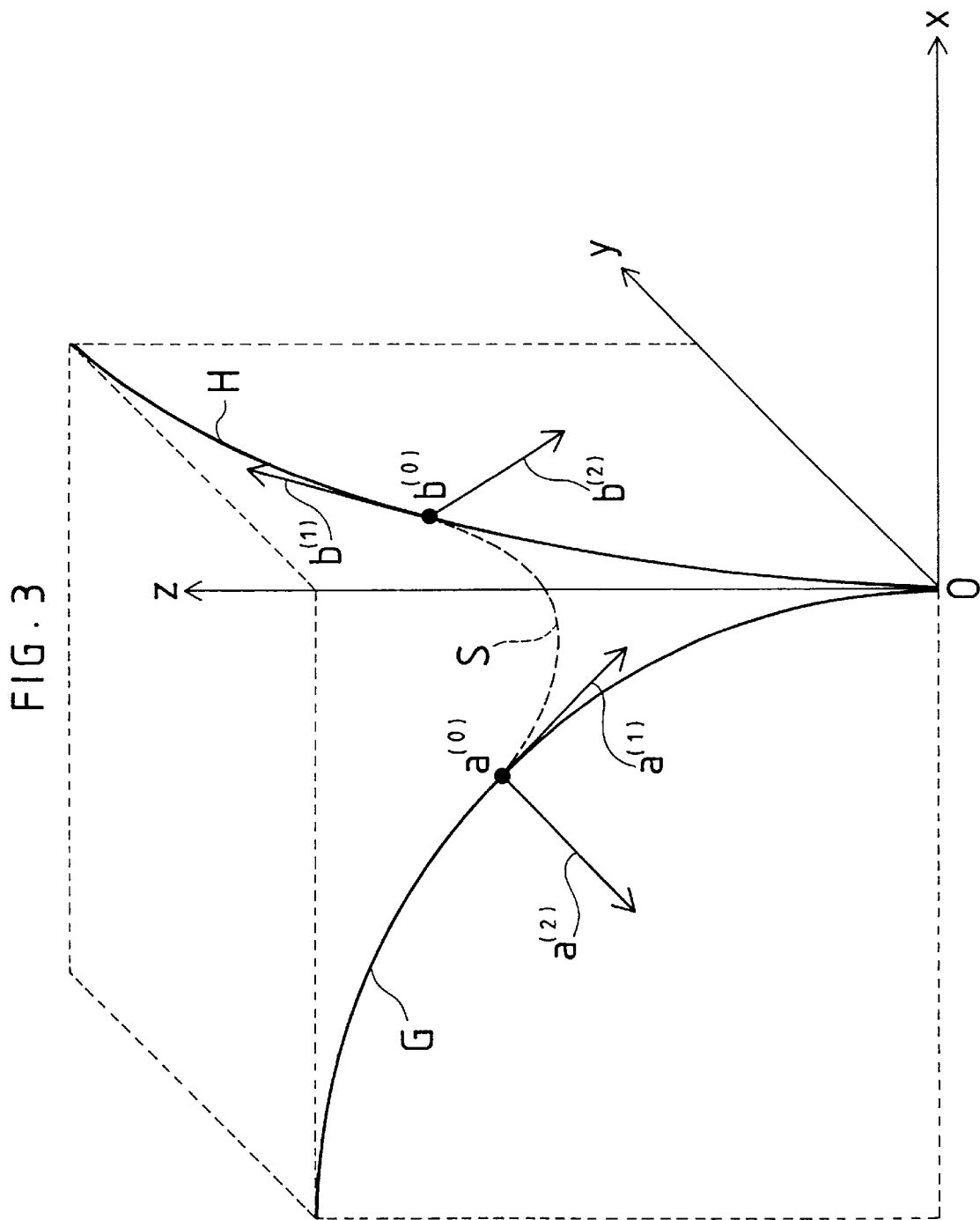
FIG. 3 is a diagram illustrating a connecting motion for smoothly connecting the paths of two arcuate motions.

In FIG. 3, symbols G and H represent paths of two arcuate motions, respectively, and are plotted passing the origin O of a three-dimensional orthogonal coordinate system O-xyz. For this embodiment, the procedure of calculation for the interpolation process for smoothly connecting points $a^{(0)}$ and $b^{(0)}$ on the arcuate paths G and H by a connecting curve S will be described with reference to the case [1] wherein velocity control is performed so that the velocity is kept constant along a connecting curve having class-$C^2$ smoothness, the case [2] wherein velocity control is performed so that the velocity is kept constant along a connecting curve having an ordinary class-$C^k$ smoothness (where k is a positive integer), and the case [3] wherein ordinary velocity control is performed so that the velocity is varied along the connecting curve. Various symbols appearing in the following description and in FIG. 3 have the meanings listed below. Symbols not included in the following list will be explained when necessary.

$a^{(0)}$: Position vector representing the starting point of the connecting curve S.

$b^{(0)}$: Position vector representing the ending point of the connecting curve S.

$a^{(1)}$: Vector (velocity vector) representing the moving velocity of the robot at the starting point of the connecting curve S.

$b^{(1)}$: Vector representing the velocity of the robot at the ending point of the connecting curve S.

$a^{(2)}$: Vector representing the acceleration of the robot at the starting point of the connecting curve S.

$b^{(2)}$: Vector representing the acceleration of the robot at the ending point of the connecting curve S.

$p(T, t)$: A function representing the connecting curve S using a parameter t representing time instant, and the value thereof is a vector quantity.

The parameter t can be any value falling within a range of $0 \leq t \leq T$, wherein t=0 indicates a time instant corresponding to the starting point of the connecting curve S, and t=T indicates a time instant corresponding to the ending point of the connecting curve S. T represents a time period (time period connection) required for the passage through the connecting curve S. The above notation is used taking account of the fact that the value (positive real number) of T is unknown before calculation.

Case [1] wherein velocity control is performed so that the velocity is kept constant along a connecting curve having class-$C^2$ smoothness:

In this case, it is assumed that the velocities $a^{(1)}$ and $b^{(1)}$ at the opposite ends (i.e., the ending point of the path G of the first arcuate motion and the starting point of the path H of the second arcuate motion) of the connecting curve S are equal in magnitude, and this is indicated by equation (1) below. This assumption is reasonable in view of the conditions that the two motions should be connected smoothly and that the velocity should be kept constant. Velocity v, which is used as a reference value for the velocity control, is naturally a scaler quantity.

$$v \stackrel{def}{=} \|a^{(1)}\| = \|b^{(1)}\| \tag{1}$$

Thus, an interpolation formula for determining the interpolation points on the connecting curve S has to be established so that the velocity along the connecting curve becomes at least an approximately constant value v and also that class-$C^2$ smoothness may be obtained with respect to the parameter t, which represents time instant. In order for the connecting curve S to have class-$C^2$ smoothness with respect to time instant t, the aforementioned function p(T, t) representing the connecting curve S by means of the parameter must fulfill boundary conditions (2) to (7) indicated below.

$$p(T, 0) = a^{(0)} \tag{2}$$

$$p(T, T) = b^{(0)} \tag{3}$$

$$\frac{\partial p}{\partial t}(T, 0) = a^{(1)} \tag{4}$$

$$\frac{\partial p}{\partial t}(T, T) = b^{(1)} \tag{5}$$

$$\frac{\partial^2 p}{\partial t^2}(T, 0) = a^{(2)} \tag{6}$$

$$\frac{\partial^2 p}{\partial t^2}(T, T) = b^{(2)} \tag{7}$$

A variety of functions p(T, t) satisfying these conditions are conceivable; however, in this embodiment, a polynomial equation for t is used. Options other than polynomial equation include Fourier series, for example. In the case where a polynomial is used, at least a fifth-degree polynomial is required in order to fulfill all of the above boundary conditions. In this example, equation (8) below is employed as a polynomial representing the function p(T, t).

$$p(T, t) = a^{(0)} + (t/T)^3 \{10 - 15 \cdot (t/T) + 6(t/T)^2\}(b^{(0)} - a^{(0)}) + \tag{8}$$

$$T(1 - t/T)^3(t/T)\{1 + 3 \cdot (t/T)\}a^{(1)} -$$

$$T(1 - t/T)(t/T)^3\{4 - 3 \cdot (t/T)\}b^{(1)} +$$

$$(T^2/2)(1 - t/T)^3(t/T)^2 a^{(2)} + (T^2/2)(1 - t/T)^2(t/T)^3 b^{(2)}$$

The polynomial indicated by equation (8) is derived by assuming equation (9) below as the acceleration of the function p(T, t) and applying the boundary conditions (2) to (7). In the equation below, $c_0$, $c_1$, $c_2$ and $c_3$ each represent a constant vector term. Equations (8) and (9) have a polynomial form with respect to (t/T), and this (t/T) corresponds to the variable (the rate of movement along the connecting curve based on the time) obtained by standardizing the time instant t by means of an unknown connection time period T.

$$\frac{\partial^2 p}{\partial t^2}(T, t) = \quad (9)$$
$$(1 - t/T)^3 c_0 + 3(1 - t/T)^2(t/T)c_1 + 3(1 - t/T)(t/T)^2 c_2 + (t/T)^3 c_3$$

In this stage, the parameter T representing the connection time period remains undecided, and therefore, the connecting curve S is not specifically determined yet. In the present case [1], since the intended control is such that the velocity is kept at the constant value v defined by the aforementioned equation (1), the parameter T needs to be set so that, for the function p(T, t) indicated by equation (8), the velocity is kept as close to v as possible while t varies within the range $0 \le t \le T$.

To attain this, a deviation of the velocity from the constant value v has to be evaluated by using some suitable evaluation function $\epsilon(T)$, and the parameter T has to be determined so that the evaluation function $\epsilon(T)$ can be optimized. Various functions can be employed as such evaluation function; however, in this example, a function $\epsilon(T)$ indicated by equation (10) below is used.

$$\epsilon(T) \stackrel{def}{=} \left| \frac{1}{T} \int_0^T \left\| \frac{\partial p}{\partial t}(T, t) \right\|^2 dt - v^2 \right| = \quad (10)$$

$$\left| \frac{10}{7T^2} \|b^{(0)} - a^{(0)}\|^2 - \frac{3}{7T}(b^{(0)} - a^{(0)}) \cdot (a^{(1)} + b^{(1)}) + \right.$$

$$\frac{1}{42}(b^{(0)} - a^{(0)}) \cdot (-a^{(2)} + b^{(2)}) +$$

$$\frac{1}{35}(8\|a^{(1)}\|^2 - a^{(1)} \cdot b^{(1)} + 8\|b^{(1)}\|^2) - v^2 +$$

$$T\left\{ \frac{1}{30}(a^{(1)} \cdot a^{(2)} - b^{(1)} \cdot b^{(2)}) + \frac{1}{105}(a^{(1)} \cdot b^{(2)} - b^{(1)} \cdot a^{(2)}) \right\} +$$

$$\left. \frac{T^2}{630}(\|a^{(2)}\|^2 + a^{(2)} \cdot b^{(2)} + \|b^{(2)}\|^2) \right|$$

The calculation for determining the parameter T can be reduced to the optimization problem of the above evaluation function $\epsilon(T)$ when $a^{(0)}$, $b^{(0)}$, $a^{(1)}$, $b^{(1)}$, $a^{(2)}$, $b^{(2)}$ and v are given as specific values, respectively. In this case, a minimization problem of $\epsilon(T)$ indicated by equation (11) below needs to be solved.

$$\epsilon(T) \to \min \quad (11)$$

Here, specific values indicated by the following equations (12) to (18) are assumed as examples.

where $$a^{(0)} = \left[ -250(2 - \sqrt{2}), 0, 250\sqrt{2} \right] \quad (12)$$

$$b^{(0)} = \left[ 0, 250(2 - \sqrt{2}), 250\sqrt{2} \right] \quad (13)$$

$$a^{(1)} = \left[ 500\sqrt{2}, 0, -500\sqrt{2} \right] \quad (14)$$

$$b^{(1)} = \left[ 0, 500\sqrt{2}, 500\sqrt{2} \right] \quad (15)$$

$$a^{(2)} = \left[ -1000\sqrt{2}, 0, -1000\sqrt{2} \right] \quad (16)$$

-continued $$b^{(2)} = \left[ 0, 1000\sqrt{2}, -1000\sqrt{2} \right] \quad (17)$$

$$v = 1000 \quad (18)$$

$$\epsilon(T) = 0, \quad (19)$$

an equation derived by substituting "0" for "min" in equation (11) gives a significant solution (T>0), which is $$T = T_0 = \text{approximately } 0.270 \quad (20).$$

Figure 4:
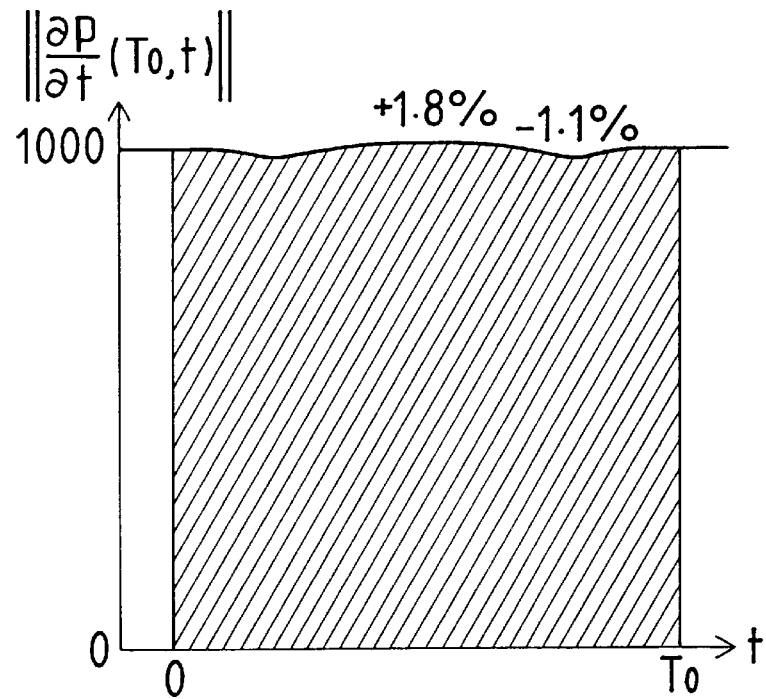
FIG. 4 is a graph showing the result of calculation of a transition of velocity (absolute value of the result of the time-based partial differentiation of the position) by use of a specific numerical value according to the embodiment corresponding to case [1]
Figure 5:
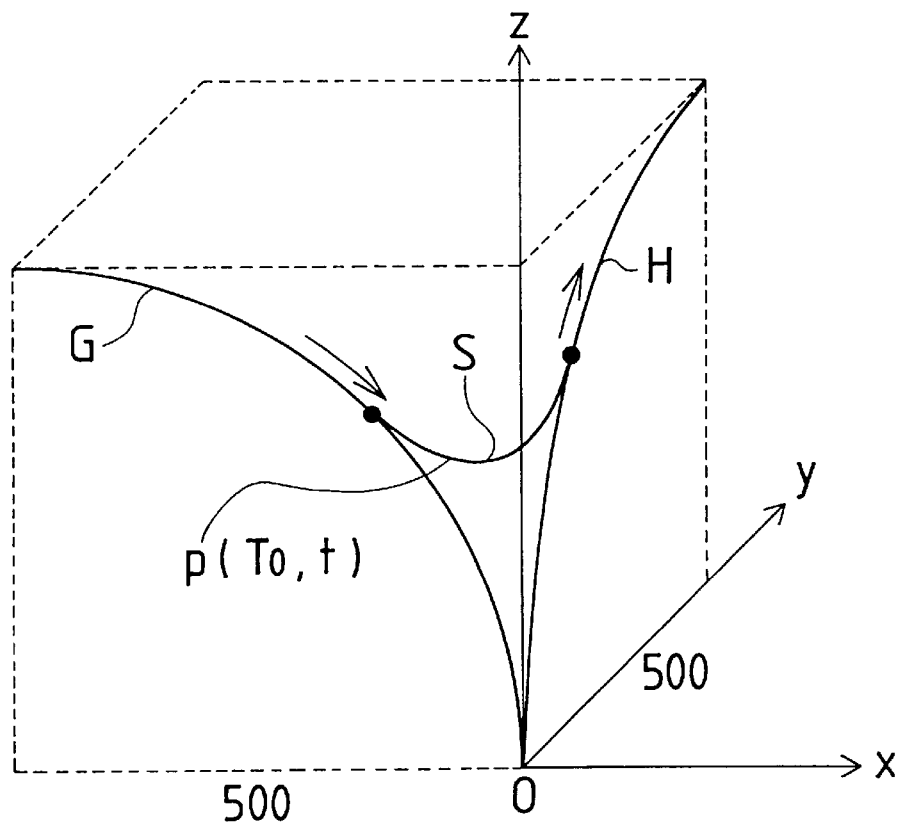
FIG. 5 is a diagram showing a connecting curve S and motion paths preceding and following the same, obtained according to the embodiment corresponding to a case of FIG. 4.
Figure 6:
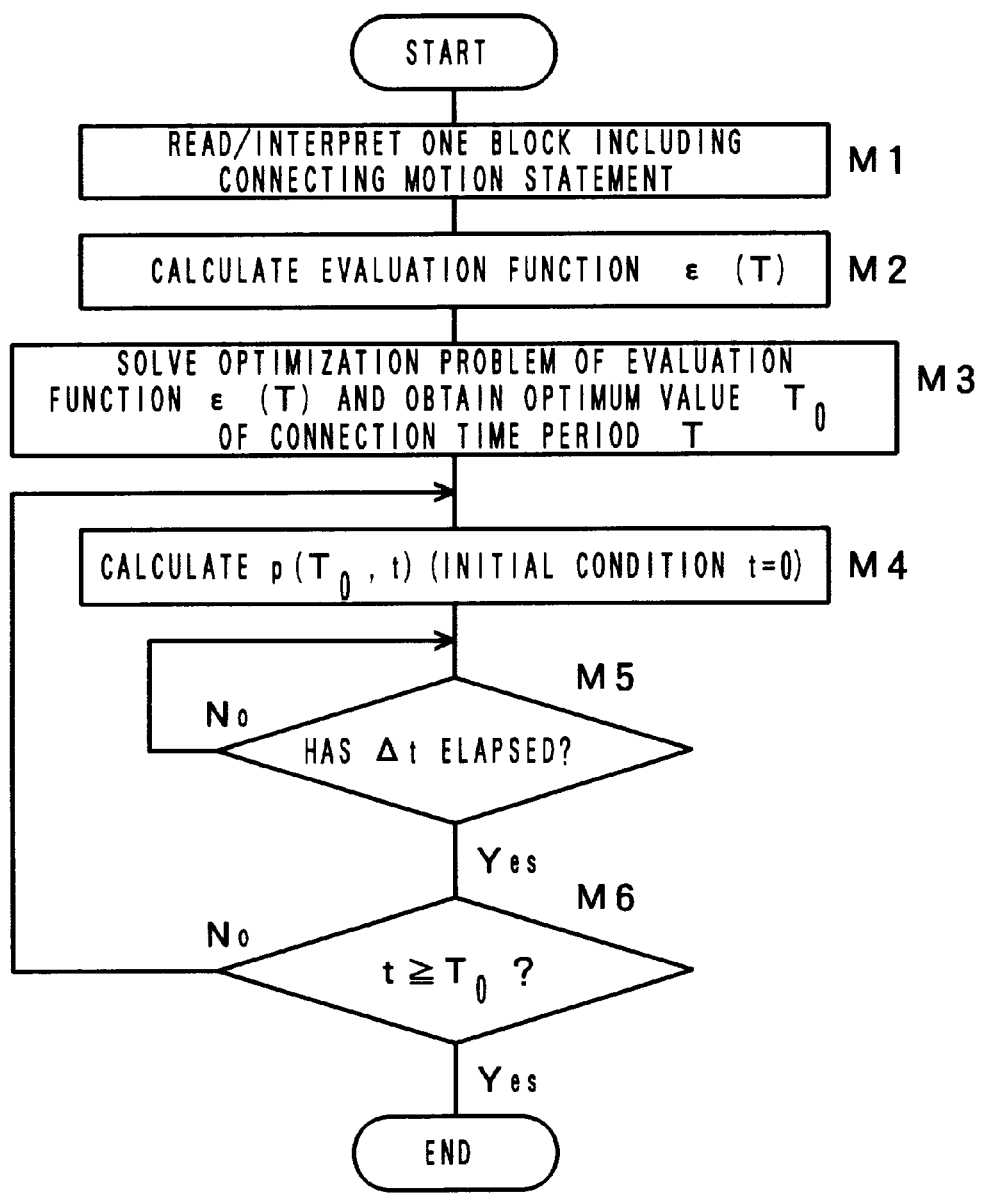
FIG. 6 is a flowchart schematically showing an interpolation process for maintaining constant the velocity along the connecting curve.

Under the condition of equation (20), when the transition of the velocity (the magnitude obtained by subjecting the position to time-based partial differentiation) within the range $0 \le t \le T_0$ is calculated, a graph shown in FIG. 4 is obtained. FIG. 5 shows the connecting curve S represented by p(T, t) and the motion paths preceding and following the same. As indicated on the graph of FIG. 4, the relative deviation of the velocity from v=1000 along the connecting curve S ($0 \le t \le T_0$) is very small, or more specifically, the maximum value of deviation in the positive (+) direction is 1.8% and the maximum value of deviation in the negative (-) direction is 1.1%, proving that the constant-velocity control is achieved with good approximation. From the foregoing it follows that, by performing interpolation in three-dimensional space by means of the function $p(T_0, t)$ based on the time instant t determined by the above-described calculation in establishing the motion path planning for the movement along the route from the point $a^{(0)}$ to the point $b^{(0)}$ control can be achieved so that the robot is moved at a constant velocity along a curve smoothly connecting the points $a^{(0)}$ and $b^{(0)}$. The interpolation processing based on the function $p(T_0, t)$ is carried out subsequently to the processing for the arcuate motion G, and an outline of the interpolation processing is shown in the flowchart of FIG. 6.

First, one block including a motion statement for a connecting motion which causes the robot to move at a constant velocity along a curve smoothly connecting the points $a^{(0)}$ and $b^{(0)}$ is read from the operation program (Step M1). Then, based on the aforementioned equations (8) and (10), the evaluation function $\epsilon(T)$ is calculated (Step M2), and an optimization problem about the evaluation At function $\epsilon(T)$ is solved to obtain an optimum value $T_0$ of the parameter T (Step M3).

The calculations to be performed in Steps M2 and M3 require the data of the positions of connection points, velocity, acceleration, namely, $a^{(0)}$, $b^{(0)}$, $a^{(1)}$, $b^{(1)}$, $a^{(2)}$ and $b^{(2)}$ For these items of data, program data relating to the arcuate motions G and H or data defined for the motion path planning for the arcuate motions G and H may be used.

After the optimum value $T_0$ is obtained, the calculation of interpolation points is started. The interpolation points are specified by repeating the calculation of the aforementioned equation (8) under the condition $T=T_0$ by gradually increasing t for each processing cycle $\Delta t$ until t reaches $T_0$ (Steps M4–M6).

The interpolation points specified in this manner are converted to pulses (move commands) representing interpolation points for the individual axes by an inverse transformation calculation known in the art, and the pulses thus obtained are transferred to the servo control systems associated with the respective axes. In accordance with the received move commands, the servo control systems of the respective axes control the corresponding servomotors of the robot. As a result, control operation can be achieved so that the robot is moved at a constant velocity v along the connecting curve S which smoothly connects the connection points $a^{(0)}$ and $b^{(0)}$ and which is expressed by $p(T_0, t)$.

Case [2] wherein velocity control is performed so that the velocity is kept constant along a connecting curve having ordinary class-$C^k$ smoothness (where k is a positive integer):

The method described above with reference to the case [1] (constant-velocity control for class-$C^2$) is expanded and generalized as described below adapting to case [2].

First thing to be done is to make it possible to draw a connecting curve having a class-$C^k$ smoothness (k is a positive integer) with respect to time instant t and at a (approximately) constant velocity v (>0). The boundary conditions for the connecting curve can generally be given by equations (21) to (23) below.

$$\text{For } \forall i \in \{0, \cdots, k\}, \tag{21}$$

$$\frac{\partial^i p}{\partial t^i}(T, 0) = a^{(i)} \tag{22}$$

$$\frac{\partial^i p}{\partial t^i}(T, T) = b^{(i)}, \tag{23}$$

where $a^{(i)}$ and $b^{(i)}$ are values to be given beforehand by the program data or the like, and are to satisfy the following conditions (24) to (26):

$$a^{(i)}, b^{(i)} \in R^n \tag{24}$$

(where $R^n$ is an n-dimensional real vector space)

$$\|a^{(1)}\| = \|b^{(1)}\| = v \tag{25}$$

$$n \text{ is a positive integer (usually, } n=3\text{)} \tag{26}$$

Even if a function $p(T, t)$ which fulfills these boundary conditions and also provides class-$C^k$ smoothness with respect to time instant t can be found, it is, in general, impossible, in this stage, to make the velocity, that is, the magnitude of the partial differential of t in the function $p(T, t)$, sufficiently close to the constant value v within the interval $0 \leq t \leq T$. Therefore, it should be considered to adjust the value of the unknown parameter T, as in the case [1]. To attain this, a suitable evaluation function $\epsilon(T)$ has to be given, and an optimization problem about this function, that is, $$\epsilon(T) \to \min \tag{27},$$

has to be solved for T. Examples of such evaluation function are shown the following equations in (28) to (31).

$$\varepsilon(T) \stackrel{def}{=} \left| \frac{1}{T} \int_0^T \left\| \frac{\partial p}{\partial t}(T, t) \right\| dt - v \right| \tag{28}$$

$$\varepsilon(T) \stackrel{def}{=} \left| \frac{1}{T} \int_0^T \left\| \frac{\partial p}{\partial t}(T, t) \right\|^2 dt - v^2 \right| \tag{29}$$

$$\varepsilon(T) \stackrel{def}{=} \frac{1}{T} \int_0^T \left( \left\| \frac{\partial p}{\partial t}(T, t) \right\| - v \right)^2 dt \tag{30}$$

$$\varepsilon(T) \stackrel{def}{=} \frac{1}{T} \int_0^T \left( \left\| \frac{\partial p}{\partial t}(T, t) \right\|^2 - v^2 \right)^2 dt \tag{31}$$

This problem can be solved analytically or approximately by following a procedure similar to that employed in the case [1] to find $p(T, t)$. In the case where a polynomial equation is employed for $p(T, t)$, the number of degree 1 thereof is set to a value greater than or equal to a predetermined value which is determined depending on k (in the case of k=2 mentioned above, l=5), whereby a polynomial equation satisfying the boundary conditions (21) to (23) can be derived.

In motion path planning for the movement along the route from the point $a^{(0)}$ to the point $b^{(0)}$, when interpolation in three-dimensional space is made by using the function $p(T, t)$ wherein $T=T_0$ (solution of the optimization problem), control such that the robot is moved at a constant speed along a curve connecting the points $a^{(0)}$ and $b^{(0)}$ with class-$C^k$ smoothness can be realized. The interpolation process based on the function $p(T_0, t)$ is identical with that carried out in the case [1] (see the flowchart of FIG. 6), and so the description thereof is omitted.

Case [3] wherein ordinary velocity control is performed by varying the velocity along the connecting curve:

Here, a case where, instead of the condition that the velocity is kept constant along the connecting curve, the condition that the velocity is controlled in a desired manner along the connecting curve is imposed will be discussed. In this case, however, the connecting curve to be obtained is required to maintain class-$C^k$ smoothness (k is a positive integer).

First, following the procedure mentioned above with reference to the case [1] or [2], an optimum value $T_0$ of the parameter T is obtained, and an optimized function $p(T_0, t)$ is determined. This function of which T is fixed at $T_0$ is hereinafter referred to as $q(t)$.

$$q(t) \stackrel{def}{=} p(T_0, t) \tag{32}$$

For $q(t)$, an adjustment function $f(t)$ satisfying the following conditions (33) to (37) is derived, and a Composite function $(q \circ f)(t)$ is introduced to be used as a basis of the interpolation formula, whereby it becomes possible to perform ordinary velocity control. Here, sign $\circ$ is used to represent a composite function, and the composite function $(q \circ f)(t)$ will be indicated alternatively by $s(t)$ where appropriate.

$$f: R \to R \tag{33}$$

(where R represents real number field.)

$f$ is class $C^k$ in R. (34)

$f$ is monotone increase in narrow sense. (35)

$$f(0) = 0 \tag{36}$$

For a certain positive value $t_0$, $f(t)$ satisfies $$f(t_0) = T_0. \tag{37}$$

Considering $f(t)=t$, as a special case, which is one of functions satisfying the above conditions (33) to (37), $s(t) = (q \circ f)(t)$ itself equals $q(t)$, and this case coincides with the case [1] or [2]. If interpolation is performed based on this relationship, then control at a constant velocity V can naturally be realized.

By using such composite function $s(t)=(q \circ f)(t)$ as a basis of the interpolation formula, the advantages mentioned below can be achieved simultaneously.

1. The path of $q(t)=p(T_0, t)$ $[0 \leq t \leq T_0]$ coincides with the path of the composite function $s(t)=(q \circ f)(t)$ $[0 \leq t \leq f^{-1}(T_0)]$.
2. The velocity given by equation (38) below, on the other hand, can be varied freely by selecting the adjustment function $f(t)$. That is, the function f can be regarded as having the capability to adjust (expand and compress) the lapse of time.

$$\left\|\frac{d(q \circ f)}{dt}(t)\right\| = \left\|\dot{f}(t)(\dot{q} \circ f)(t)\right\|$$ (38)

As a specific example of varying the velocity along the connecting curve, an interpolation method which permits a "connecting motion, in which deceleration from an initial velocity $\|a^{(1)}\|=v$ to a terminal velocity $\|b^{(1)}\|=v/2$ is performed along the connecting curve S", will be explained on the basis of the connecting motion, in which the velocity is controlled to a constant velocity, with reference to the case [1] (see FIGS. 4–6 and the related explanation). In this case, it is assumed that the required smoothness for the connecting curve S is of class-$C^2$, as in the case [1]. The class-$C^2$ smoothness ensures the continuity of position, velocity and acceleration, and is a rational fundamental requirement for causing the robot to make smooth motion (especially in the vicinity of the connection points).

In this example, the procedure described below is employed to derive an adjustment function f(t) that will not spoil class-$C^2$ smoothness.

First, a function g(t) and constants $T_1$ and $T_2$ satisfying conditions (39) to (42) below are given. Then, when a function f(t) represented by equation (43) is given the function f(t) thus derived satisfies all of the aforementioned conditions (33) to (37) (in this example, k=2).

$$g: R \to R$$ (39)

(where R represents real number field.)

$$g(t) = \begin{bmatrix} 1 & (t \leq 0) \\ \frac{1}{2} & (0 < t) \end{bmatrix}$$ (40)

$$T_1 > 0, T_2 > 0$$ (41)

$$T_1 > T_2$$ (42)

$$f(t) = \frac{1}{T_1 T_2} \int_0^t \left( \int_{t_3-T_2}^{t_3} \left( \int_{t_2-T_1}^{t_2} g(t_1) dt_1 \right) dt_2 \right) dt_3$$ (43)

For arbitrary given $T_1$ and $T_2$, and the adjustment function f(t) obtained in this manner, the following equation will hold:

$$f(T_1+T_2)=(3/4)(T_1+T_2)$$ (44)

Thus, when the constants $T_1$ and $T_2$ are selected so that the $$T_1+T_2=(4/3)T_0$$ (45)

will hold, $$f(T_1+T_2)=T_0$$ (46)

can be derived.

Figure 7:
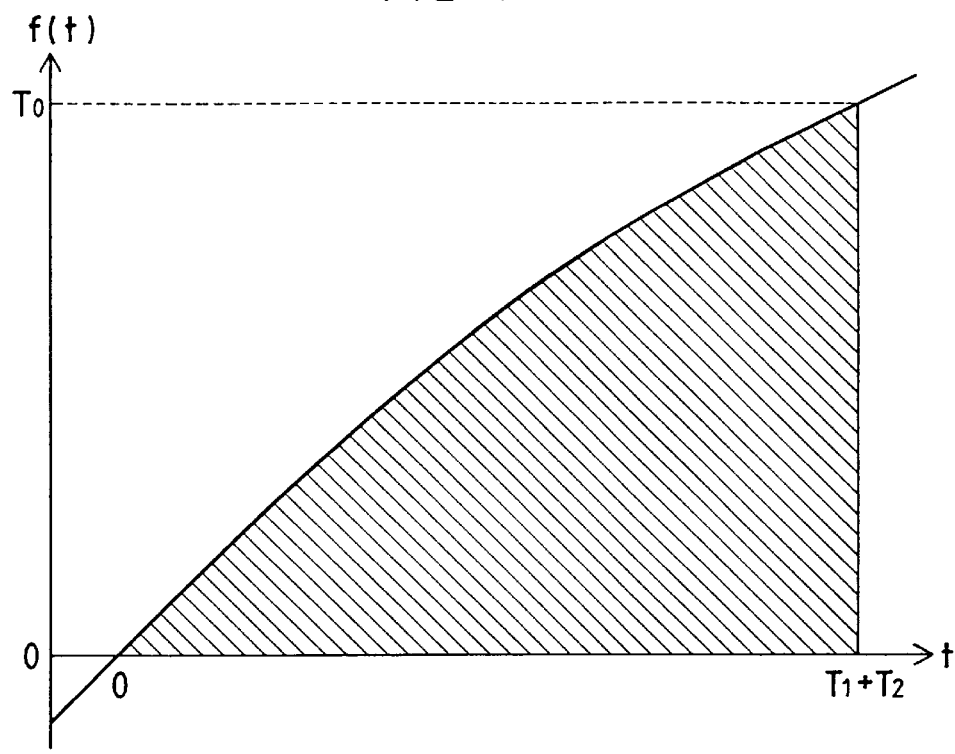
FIG. 7 is a graph showing the transition of an adjustment function $f(t)$ used in the embodiment.
Figure 8:
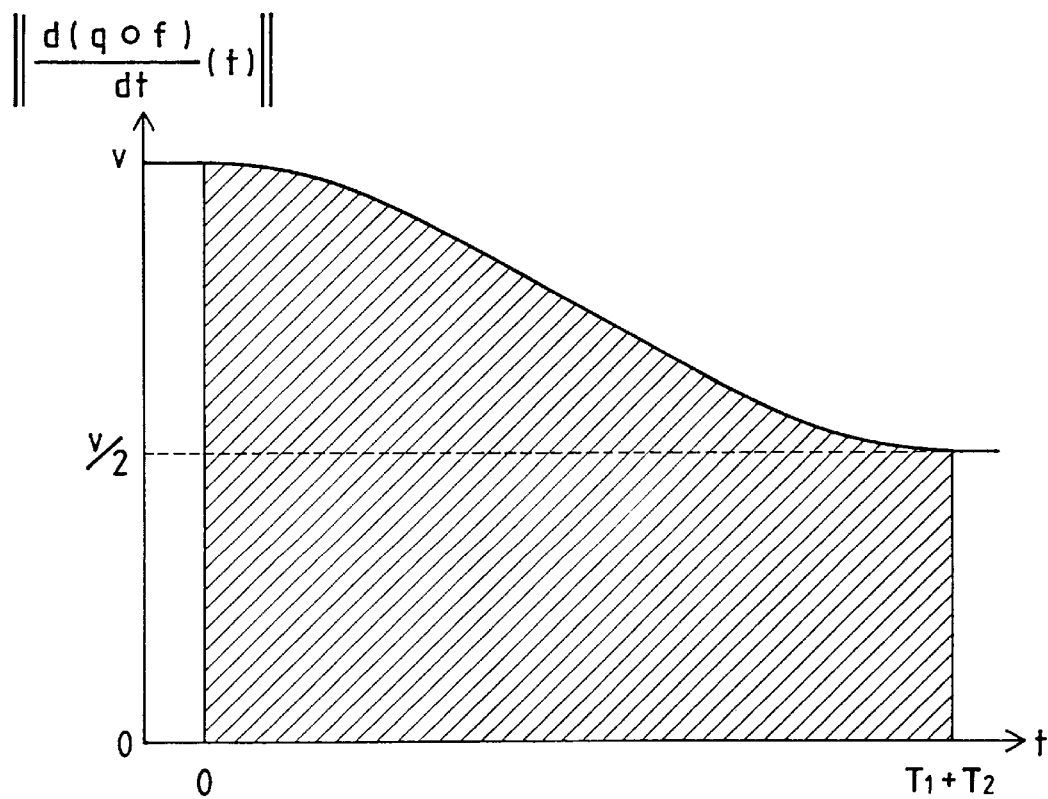
FIG. 8 is a graph showing the transition of the first-order differential of t in a composite function $(q \circ f)(t)$ using the adjustment function $f(t)$, the transition of which is shown in FIG. 7.

The graphs of FIGS. 7 and 8 respectively show the transition of the adjustment function f(t) and the transition of the magnitude of the first-order differential of t in the composite function (q∘f)(t) in the above-described case. In this case, the figures reveal that the deceleration time period and the connection time period coincide with each other corresponding to the above equation (46). The form or curve (deceleration pattern in this case) shown in the graph of FIG. 8 can be changed by selecting the combination of $T_1$ and $T_2$. This means that the transition of velocity of the robot is controllable.

Figure 9:
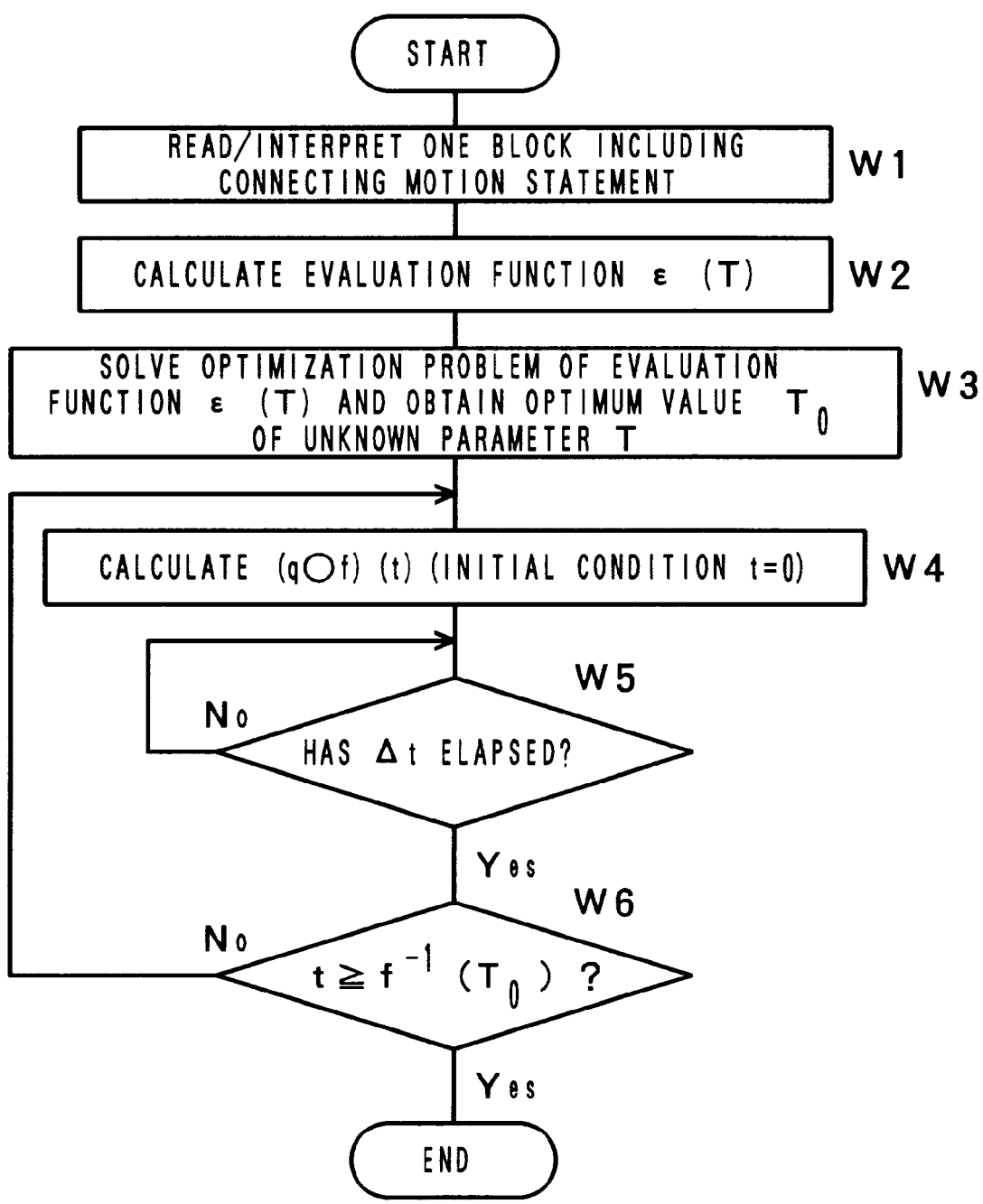
FIG. 9 is a flowchart schematically showing an interpolation process for controlling the velocity along the connecting curve to a value varying depending on the adjustment function $f(t)$.

As seen from above, by making interpolation in three-dimensional space based on the aforementioned function (q∘f) during motion path planning for the movement along the route from the point $a^{(0)}$ to the point $b^{(0)}$ control can be achieved in a manner such that the robot is moved along a curve smoothly connecting the points $a^{(0)}$ and $b^{(0)}$ while at the same time allowing the velocity thereof to be varied in accordance with the pattern specified by means of the adjustment function f(t). The interpolation process based on the function (q∘f)(t) is carried out subsequently to the process for he arcuate motion G, and an outline thereof is shown in the flowchart of FIG. 9. Data (ratio of $T_1$ to $T_2$, etc.) relating to the adjustment function f(t) is stored beforehand in the memory of the robot control device.

First, one block including a motion statement for bringing about a connecting motion causing the robot to be moved at a constant velocity along a curve smoothly connecting the points $a^{(0)}$ and $b^{(0)}$ is read from the operation program (Step W1). Then, based on the aforementioned equations (8) and (10) or on equation (8) and one of equations (28) to (31), the evaluation function $\epsilon(T)$ is calculated (Step W2), and an optimization problem for the evaluation function $\epsilon(T)$ is solved to obtain an optimum value $T_0$ of the parameter T (Step W3).

For the calculations in Steps W2 and W3, the same data $a^{(0)}$, $b^{(0)}$, $a^{(1)}$, $b^{(1)}$, $a^{(2)}$ and $b^{(2)}$ as those used in the case [1] is used. Here it should be noted that, although the data $a^{(0)}$, $a^{(1)}$ and $a^{(2)}$ representing the position, velocity and acceleration at the starting point of the connecting curve and the data $b^{(0)}$ representing the position of the ending point of the connecting curve are real data, the data $b^{(1)}$ and $b^{(2)}$ representing the velocity and acceleration at the ending point of the connecting curve is not real data and is dependent on the aforementioned conditional equation (1) etc. The reason is that the function $p(T_0, t)$ for calculating (q∘f)(t), which is to be applied finally to the interpolation formula, is derived under the condition of equation (1).

After the optimum value $T_0$ is obtained, the calculation of interpolation points is started. The interpolation points are specified by repeatedly calculating the value of the composite function (q∘f)(t) while t is gradually increased for each processing cycle $\Delta t$ until t reaches $f^{-1}(T_0)$ (Steps W4–W6). The definition of the composite function (q∘f)(t) is as already explained above. For f(t), the definition based on equation (43) using g(t) can be employed.

The interpolation points generated in this manner are converted to pulses (move commands) representing interpolation points for the individual axes by an inverse transformation calculation known in the art, and the pulses generated by the conversion are transferred to the servo control systems associated with the respective axes. In accordance with the received move commands, the servo control systems of the respective axes control the corresponding servomotors of the robot.

Consequently, control can be made so that the robot is moved along the connecting curve S that smoothly connect the connection points $a^{(0)}$ and $b^{(0)}$ at a velocity which varies depending on the adjustment function f(t). In this case, the parameter of the connecting curve S using time instant t is not $p(T_0, t)$, but (q∘f)(t). That is, (q∘f)(t) represents the connecting motion which follows the same path as $p(T_0, t)$, and the velocity of which is controlled in accordance with the adjustment function f(t).

The foregoing description is focused mainly on the case where arcuate motions are connected with a class-$C^k$ smoothness (k=2); however, even in the cases where an arcuate motion and a rectilinear motion or two rectilinear motions are to be connected to each other, interpolation for such connecting motion accompanied by velocity control can of course be performed by using the above-described technical idea of the present invention. Further, even in cases where the required class of smoothness is other than k=2, p(T, t), f(t), etc. may be suitably selected according to the technical idea explained in the above description so that the two points can be connected by a curve having a smoothness of class-$C^k$ (k=1, 3, 4, . . . ).

According to the present invention, it is possible to connect two motions (rectilinear motions or arcuate motions) to each other by a smooth connecting curve while performing control operation at varying velocity conforming to a desired transition pattern, including control operation at constant velocity. As a consequence, in various applications of robots such as sealing robot, arc welding robot, etc., it is possible to reduce the load of the system construction or teaching operation.

I claim:

1. A curve interpolation method for controlling velocity of a robot during a connecting motion which connects a first motion and a second motion by a path movement of a robot in creating a motion path plan in accordance with a robot control device, said curve interpolation method including the steps of:

(a) determining an equation representing a connecting curve smoothly connecting a first connection point specified on a path of the first motion and a second connection point specified on a path of the second motion by means of a parameter representation q(t) including time instant t;

(b) periodically creating an interpolation point in three-dimensional space using said parameter representation q(t),
      wherein, a function p(T, t) satisfying a boundary condition in accordance with class-$C^k$ (where k is a positive integer) of smoothness required for the connecting motion is prepared as an equation including an unknown parameter T corresponding to a connection time period, and a calculation process is performed to obtain a value of $T=T_0$ with which the velocity is kept approximately constant through the connecting motion by optimizing an evaluation function $\epsilon(T)$ for evaluating a deviation of a partial differential of said function p(T, t) with respect to time from a reference value in said step (a),
      $q(t)=p(T_0, t)$ is used as said parameter representation q(t) in said step (b), whereby the velocity is controlled to a constant value during the connecting motion; and (c) controlling the velocity of the robot during the connecting motion based upon steps (a) and (b).

2. A curve interpolation method according to claim 1, wherein said class of smoothness required for the connecting motion is class-$C^2$, and at least one of said first and second motions is an arcuate motion.

3. A curve interpolation method according to claim 1, wherein said class of smoothness required for the connecting motion is class-$C^2$.

4. A curve interpolation method according to claim 1, wherein at least one of said first and second motions is an arcuate motion.

5. A curve interpolation method for controlling velocity of a robot during a connecting motion which connects a first motion and a second motion by a path movement of a robot in creating a motion path plan in accordance with a robot control device, said curve interpolation method including the steps of:

(a) determining an equation representing a connecting curve smoothly connecting a first connection point specified on a path of the first motion and a second connection point specified on a path of the second motion by means of a parameter representation q(t) including time instant t;

(b) periodically creating an interpolation point in three-dimensional space using said parameter representation q(t),
      wherein, a function p(T, t) satisfying a boundary condition in accordance with class-$C^k$ (where k is a positive integer) of smoothness required for the connecting motion is prepared as a polynomial with respect to t including an unknown parameter T corresponding to a connection time period, and a calculation process is performed to obtain a value of $T=T_0$ with which the velocity is kept approximately constant through the connecting motion by optimizing an evaluation function $\epsilon(T)$ for evaluating a deviation of a partial differential of the function p(T, t) with respect to time from a reference value in said step (a),
      $q(t)=p(T_0, t)$ includes said parameter representation q(t) in said step (b), whereby the velocity is controlled to a constant value during the connecting motion; and (c) controlling the velocity of the robot during the connecting motion based upon steps (a) and (b).

6. A curve interpolation method according to claim 5, wherein said class of smoothness required for the connecting motion is class-$C^2$.

7. A curve interpolation method according to claim 5, wherein at least one of said first and second motions is an arcuate motion.

8. A curve interpolation method according to claim 5, wherein said class of smoothness required for the connecting motion is class-$C^2$, and at least one of said first and second motions is an arcuate motion.

9. A curve interpolation method for controlling velocity of a robot during a connecting motion which connects a first motion and a second motion by a path movement of a robot in creating a motion path plan in accordance with a robot control device, said curve interpolation method including the steps of:

(a) determining an equation representing a connecting curve smoothly connecting a first connection point specified on a path of the first motion and a second connection point specified on a path of the second motion by means of a parameter representation s(t) including time instant t;

(b) periodically creating an interpolation point in three-dimensional space using said parameter representation s(t),
      wherein, a function p(T, t) satisfying a boundary condition in accordance with class-$C^k$ (where k is a positive integer) of smoothness required for the connecting motion is prepared as an equation including an unknown parameter T corresponding to a connection time period, and a calculation process is performed to obtain a value of $T=T_0$ with which the velocity is kept approximately constant through the connecting motion by optimizing an evaluation function $\epsilon(T)$ for evaluating a deviation of a partial differential of said function p(T, t) with respect to time from a reference value in said step (a),
      $s(t)=(q \circ f)(t)$, which is a composite function of $q(t)=p(T_0, t)$ and an adjustment function f(t), is used as said parameter representation s(t) in said step (b), and said adjustment function f(t) has the class-$C^k$ smoothness and is determined in advance so that the velocity undergoes a desired transition during the connecting motion; and (c) controlling the velocity of the robot during the connecting motion based upon steps (a) and (b).

10. A curve interpolation method according to claim 9, wherein said class of smoothness required for the connecting motion is class-$C^2$, and at least one of the first and second motions is an arcuate motion.

11. A curve interpolation method according to claim 9, wherein said class of smoothness required for the connecting motion is class-$C^2$.

12. A curve interpolation method according to claim 9, wherein at least one of said first and second motions is an arcuate motion.

13. A curve interpolation method for controlling velocity of a robot during a connecting motion which connects a first motion and a second motion by a path movement of a robot in creating a motion path plan in accordance with a robot control device, said curve interpolation method including the steps of:

(a) determining an equation representing a connecting curve smoothly connecting a first connection point specified on a path of the first motion and a second connection point specified on a path of the second motion by means of a parameter representation s(t) including time instant t;

(b) periodically creating an interpolation point in three-dimensional space using said parameter representation s(t), wherein, a function p(T, t) satisfying a boundary condition in accordance with class-$C^k$ (where k is a positive integer) of smoothness required for the connecting motion is prepared as a polynomial with respect to t including an unknown parameter T corresponding to a connection time period, and a calculation process is performed to obtain a value of T=$T_0$, with which the velocity is kept approximately constant through the connecting motion by optimizing an evaluation function $\epsilon(T)$ for evaluating a deviation of a partial differential of the function p(T, t) with respect to time from a reference value in said step (a), s(t)=(q∘f)(t), which is a composite function of q(t)=p($T_0$, t) and an adjustment function f(t), is used as said parameter representation s(t) in said step (b), and said adjustment function f(t) has the class-$C^k$ smoothness and is determined in advance so that the velocity undergoes a desired transition during the connecting motion; and (c) controlling the velocity of the robot during the connecting motion based upon steps (a) and (b).

14. A curve interpolation method according to claim 13, wherein said class of smoothness required for the connecting motion is class-$C^2$.

15. A curve interpolation method according to claim 13, wherein at least one of said first and second motions is an arcuate motion.

16. A curve interpolation method according to claim 13, wherein said class of smoothness required for the connecting motion is class-$C^2$, and at least one of the first and second motions is an arcuate motion.

* * * * *

UNITED STATES PATENT AND TRADEMARK OFFICE
CERTIFICATE OF CORRECTION

PATENT NO.: 5,988,850
DATED : November 23, 1999
INVENTOR(S): Hidetoshi KUMIYA

It is certified that error appears in the above-identified patent and that said Letters Patent is hereby corrected as shown below:

Col. 2, line 34, change "eriodically" to --periodically--.
Col. 3, line 53, change "$0 \leq t \leq f^1(T_0)$" to --$0 \leq t \leq f^1(T_0)$--.
    line 55, change "$[0 \leq t \leq T_0]$" to --$[0 \leq t \leq T_0]$--.
Col. 5, line 62, change "$0 \leq t \leq T$" to --$0 \leq t \leq T$--.
Col. 7, line 20, change "$0 \leq t \leq T$" to --$0 \leq t \leq T$--.
Col. 8, line 16, change "$0 \leq t \leq T_0$" to --$0 \leq t \leq T_0$--;
    line 21, change "$(0 \leq t \leq T_0)$" to --$(0 \leq t \leq T_0)$--;
    line 43, delete "At".
Col. 9, line 41, change "$0 \leq t \leq T$" to --$0 \leq t \leq T$--.
Col. 10, line 33, change "Composite" to --composite--;
    line 62, change "$[0 \leq t \leq T_0]$" to --$[0 \leq t \leq T_0]$--;
    line 63, change "$[0 \leq t \leq f^1(T_0)]$" to --$[0 \leq t \leq f^1(T_0)]$--.

Signed and Sealed this

Thirtieth Day of May, 2000

*Attest:*

Q. TODD DICKINSON

*Attesting Officer*     *Director of Patents and Trademarks*